(12) United States Patent
Anderson et al.

(10) Patent No.: US 11,753,351 B1
(45) Date of Patent: Sep. 12, 2023

(54) LOADER-MOUNTABLE COMPOST TURNING APPARATUS

(71) Applicant: KOOIMA COMPANY, Rock Valley, IA (US)

(72) Inventors: Thor Anderson, Rock Valley, IA (US); Joel A. Negus, Sioux Center, IA (US); Nolan Den Boer, Rock Valley, IA (US); Greg Dejager, Rock Rapids, IA (US)

(73) Assignee: Kooima Ag, Inc., Rock Valley, IA (US)

( * ) Notice: Subject to any disclaimer, the term of this patent is extended or adjusted under 35 U.S.C. 154(b) by 719 days.

(21) Appl. No.: 16/228,958

(22) Filed: Dec. 21, 2018

Related U.S. Application Data (60) Provisional application No. 62/646,623, filed on Mar. 22, 2018.

(51) Int. Cl.
| | |
|---|---|
| *C05F 17/00* | (2020.01) |
| *C05F 17/914* | (2020.01) |
| *E02F 3/96* | (2006.01) |
| *B01F 27/052* | (2022.01) |
| *B01F 27/70* | (2022.01) |
| *B01F 27/112* | (2022.01) |
| *B01F 27/072* | (2022.01) |
| *B01F 33/502* | (2022.01) |
| *B01F 35/32* | (2022.01) |
| *B01F 101/33* | (2022.01) |

(52) U.S. Cl.
CPC ............ *C05F 17/914* (2020.01); *B01F 27/052* (2022.01); *B01F 27/0724* (2022.01); *B01F 27/112* (2022.01); *B01F 27/70* (2022.01); *B01F 33/5021* (2022.01); *B01F 35/3204* (2022.01); *E02F 3/96* (2013.01); *B01F 2101/33* (2022.01)

(58) Field of Classification Search
CPC .... C05F 17/914; C05F 17/043; A01D 78/006; A01D 78/02
See application file for complete search history.

(56) References Cited

U.S. PATENT DOCUMENTS

| | | | |
|---|---|---|---|
| 4,478,520 A | 10/1984 | Cobey | |
| 5,253,467 A | 10/1993 | Sims, Jr. | |
| 5,586,731 A | 12/1996 | Glaze et al. | |
| 5,803,379 A | 9/1998 | Glaze | |
| 6,164,052 A * | 12/2000 | Golay | A01D 84/00 56/366 |
| 6,893,862 B1 * | 5/2005 | Horn et al. | B09C 1/10 435/243 |
| 7,681,382 B2 | 3/2010 | Viaud | |
| 8,844,254 B2 * | 9/2014 | Hansen | A01D 78/02 56/372 |
| 10,617,061 B2 | 4/2020 | Anderson et al. | |
| 2011/0104795 A1 * | 5/2011 | Ranck et al. | C05F 17/943 435/290.2 |

\* cited by examiner

*Primary Examiner* — Elizabeth Insler
(74) *Attorney, Agent, or Firm* — Jeffrey A. Proehl; Woods, Fuller, Shultz & Smith, PC (57) ABSTRACT

A compost turning apparatus mountable on a loader for turning composting materials may include a mobile base having a frame with inboard, outboard, and bridging portions defining a windrow tunnel through which a windrow of composting materials are passed. The inboard portion may be configured to mount on the loader. The apparatus may include a rotor extending across the windrow tunnel, and the rotor may include a rotor shaft and paddles on the rotor shaft. A rotor drive assembly on the mobile base may rotate the rotor using a motor hydraulically-connectable to a hydraulic power system of the loader.

20 Claims, 11 Drawing Sheets

LOADER-MOUNTABLE COMPOST TURNING APPARATUS

REFERENCE TO RELATED APPLICATIONS

This application claims the benefit of U.S. Provisional Pat. Application No. 62/646,623, filed Mar. 22, 2018, which is hereby incorporated by reference in its entirety.

BACKGROUND

Field

The present disclosure relates to compost handling machinery and more particularly pertains to a new loader-mountable compost turning apparatus for effectively turning composting materials while maintaining the materials in a windrow.

SUMMARY

In one aspect, the present disclosure relates to a compost turning apparatus mountable on at least one support arm of a loader for turning composting materials in a windrow may include a mobile base having a frame with an inboard portion, an outboard portion, and a bridging portion extending between the inboard and outboard portions. The frame may define a windrow tunnel through which a windrow of composting materials are passed, and the windrow tunnel may be positioned between the inboard and outboard portions of the frame and below the bridging portion of the frame. The inboard portion of the frame may be configured to mount on the at least one support arm of the loader. The apparatus may include a rotor rotatably mounted on the mobile base and extending across the windrow tunnel, and the rotor may include a rotor shaft rotatably mounted on the frame and a plurality of paddles mounted on the rotor shaft. The apparatus may also include a rotor drive assembly mounted on the mobile base and being configured to rotate the rotor with respect to the frame, and the rotor drive assembly includes a motor hydraulically-connectable to a hydraulic power system of the loader.

In another aspect, the disclosure relates to a system which may comprise a loader having a loader frame and at least one support arm pivotally mounted on the loader frame, and the loader may have a hydraulic power system. The system may also include a compost turning apparatus mounted on the at least one support arm of the loader for turning composting materials in a windrow. The apparatus may comprise a mobile base having a frame with an inboard portion, an outboard portion, and a bridging portion extending between the inboard and outboard portions. The frame may define a windrow tunnel through which a windrow of composting materials are passed, and the windrow tunnel may be positioned between the inboard and outboard portions of the frame and below the bridging portion of the frame. The inboard portion of the frame may be mounted on the at least one support arm of the loader. The apparatus may also include a rotor rotatably mounted on the mobile base and extending across the windrow tunnel, and the rotor may include a rotor shaft rotatably mounted on the frame and a plurality of paddles mounted on the rotor shaft. The apparatus may also include a rotor drive assembly mounted on the mobile base and being configured to rotate the rotor with respect to the frame. The rotor drive assembly may include a motor hydraulically-connected to the hydraulic power system of the loader.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 11 thereof, a new loader-mountable compost turning apparatus embodying the principles and concepts of the disclosed subject matter will be described.

Figure 1:
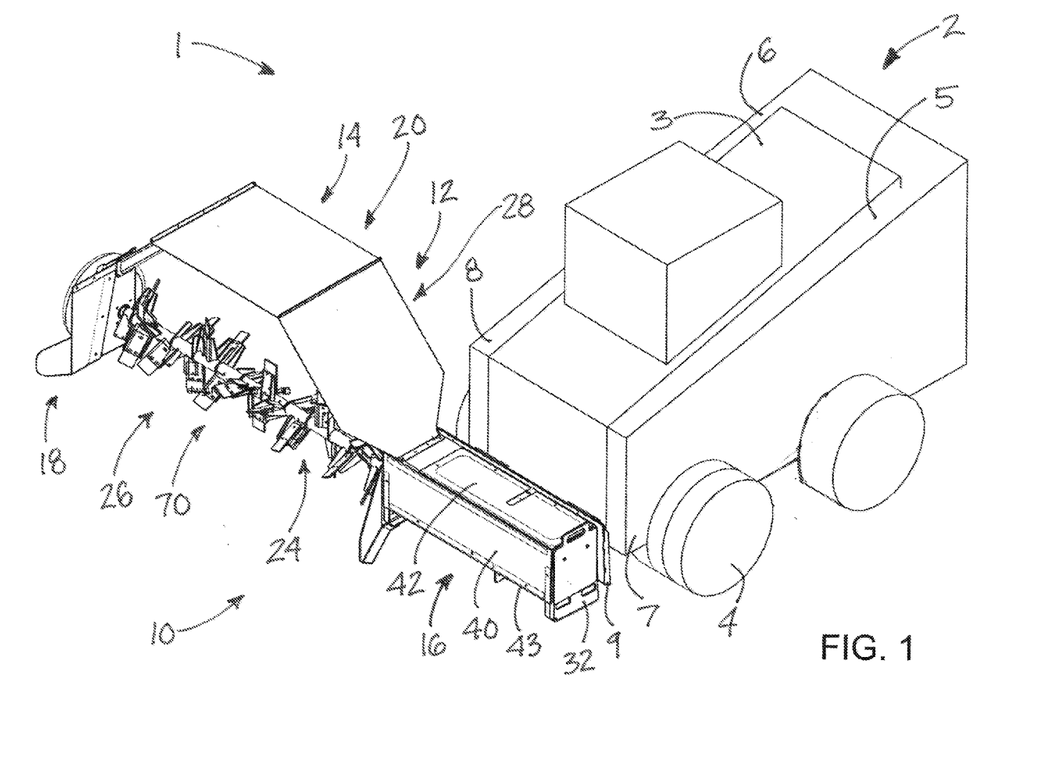
FIG. 1 is a schematic perspective view of a system with a loader and a new loader-mountable compost turning apparatus according to the present disclosure.
Figure 2:
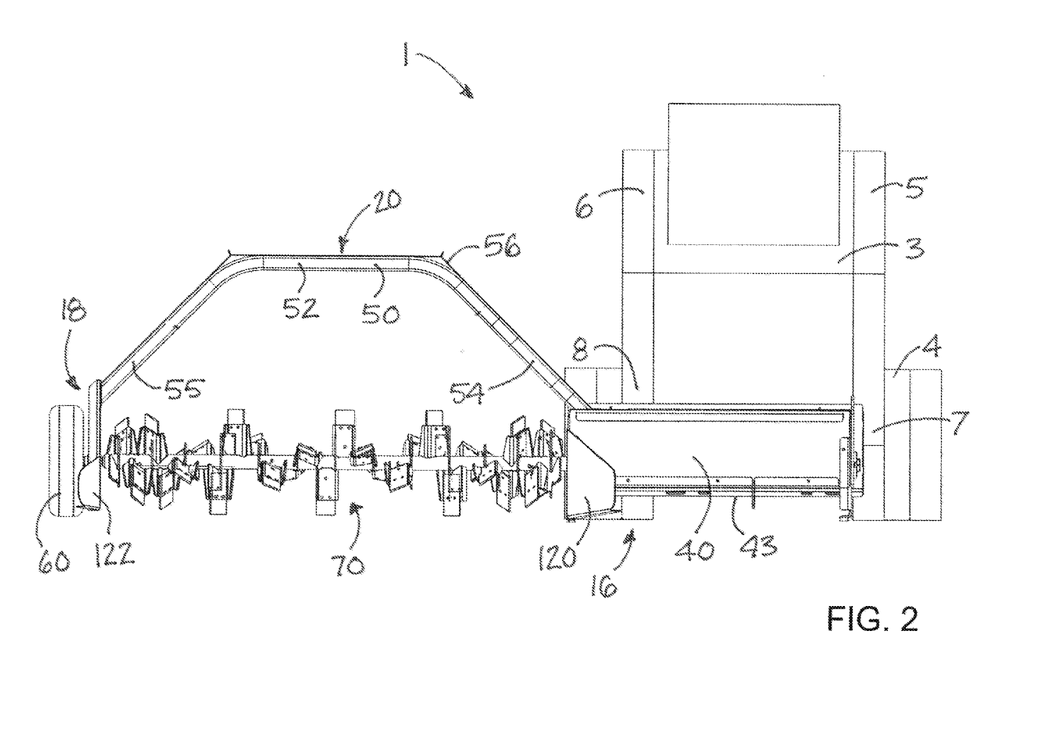
FIG. 2 is a schematic front view of the system, according to an illustrative embodiment.

In one aspect, the disclosure relates to a system 1 which may include a loader 2 which has a loader frame 3, and a least one (and typically) four wheels 4 mounted on the loader frame. The loader 2 may have at least one support arm 5 which is pivotally mounted on the loader frame, and typically although not necessarily a loader will have a pair of laterally-spaced support arms 5, 6. The support arms have distal ends 7, 8 which are capable of being raised and lowered with respect to the ground surface on which the wheels of the loader rest, usually through the action of hydraulic actuators although other types of actuators may be used. An attachment structure 9 may be mounted on the distal ends 7, 8 and be configured to removably attach various loader implements to the arms 5, 6 to permit those implements to be raised and lowered with respect to the ground surface. Such attachment structures 9 are often standardized so as to be able to removably attach to a variety of implements.

In another aspect, the disclosure relates to a compost turning apparatus 10 which may be employed with elements of the system 1, such as the loader 2, of may be used in other applications. The compost turning apparatus 10 may turn or mix or otherwise agitate composting materials situated in a windrow or other similar arrangement. The compost turning apparatus 10 may also be configured to tend to form the composting materials into a windrow after being turned by the apparatus. The apparatus 10 may be mountable on the loader 2, and may be mounted in a manner such that the apparatus 10 is able to be raised and lowered with respect to the ground surface by operation of the loader arm or arms. The compost turning apparatus 10 may be removably mounted on the support arm or arms via the attachment structure 9 of the loader, although a more permanent means of mounting could be employed.

The compost turning apparatus 10 may include a mobile base 12 which may be elongated in a longitudinal direction of the base and may have a lateral direction which is oriented substantially perpendicular to the longitudinal direction. During a typical compost turning operation, the mobile base 12 may be moved in the lateral direction to engage a windrow of material that extends along an axis that is generally parallel to the lateral direction of the base 12. The mobile base 12 may include a frame 14, and the frame may have an inboard portion 16 which is positionable relatively closer to the loader 2 when the apparatus 10 is mounted on the loader, and an outboard portion 18 which is generally located further from the loader than the inboard portion. A bridging portion 20 of the frame may extend between the inboard and outboard portions of the frame and link the inboard and outboard portions together. The inboard portion, bridging portion and outboard portion may be arranged in the longitudinal direction of the base. The frame 14 may have a forward lateral side 22 and a rearward lateral side 23, with the forward lateral side being oriented forwardly toward the direction of motion of the apparatus when supported by the loader 2 as the loader is moving in its forward direction.

The frame 14 may define a windrow tunnel 24 through which a windrow of composting materials may pass during forward movement of the loader and apparatus during the operation of the apparatus. The windrow tunnel 24 may be positioned between the inboard 16 and outboard 18 portions of the frame and may be located below the bridging portion 20 such that the bridging portion extends above the tunnel. The windrow tunnel extends between the forward 22 and rearward 23 lateral sides of the frame. The windrow tunnel 24 may have a forward opening 26 located at the forward lateral side and a rearward opening 28 which is located at the rearward lateral side.

Figure 3:
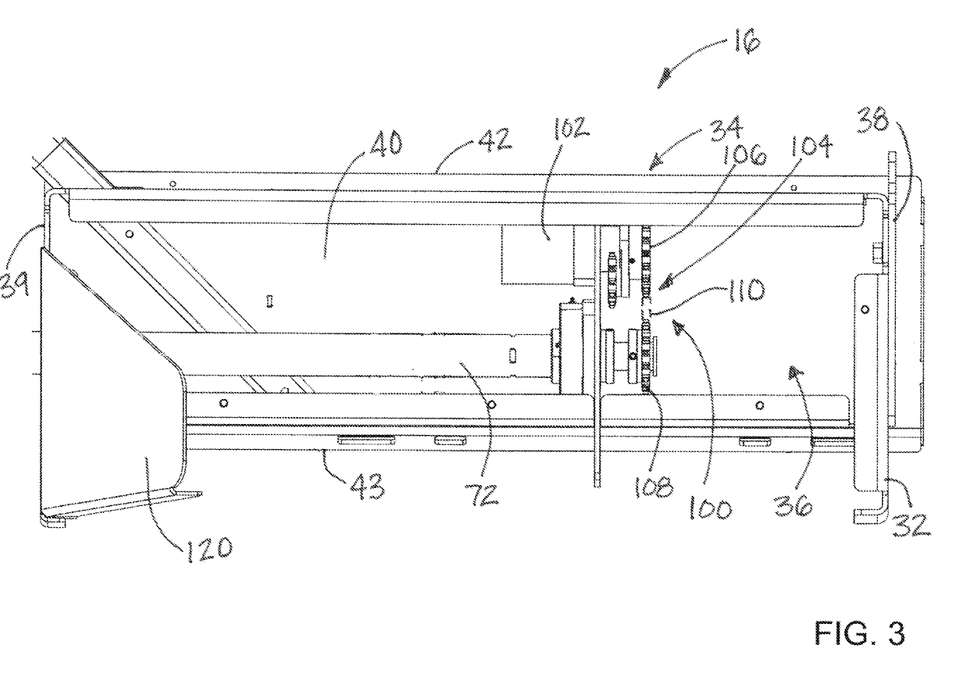
FIG. 3 is a schematic front view of the housing of the inboard portion of the frame with a wall removed to reveal detail of elements in the interior of the housing, according to an illustrative embodiment.
Figure 5:
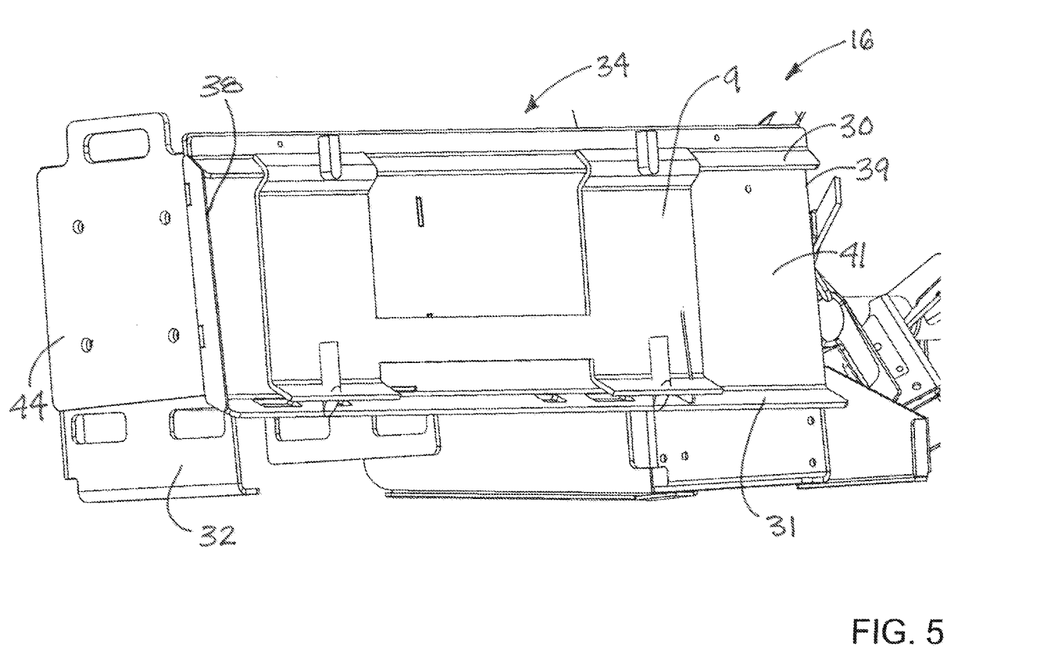
FIG. 5 is a schematic rear view of the housing of the inboard portion of the frame, along with an isolated portion of the attachment structure of the loader, according to an illustrative embodiment.

The inboard portion 16 of the frame may be configured to mount on the support arm or arms of the loader, and more specifically may be mountable on the attachment structure 9 of the loader. In one embodiment, the inboard portion may include at least one mounting rail 30 for engaging the attachment structure 9, which may comprise a mounting plate which is mounted on the support arm or arms of the loader. The mounting rail 30 may be substantially horizontally oriented, and may be positioned at the rearward lateral side 23 of the frame. A pair of the mounting rails 30, 31 may be employed with a first mounting rail 30 being located above a second mounting rail 31. Other suitable mounting structures may also be employed. The inboard portion may have a support foot 32 which extends downwardly to provide at least partial support for the frame on the ground surface when the frame is lowered by the support arms of the loader toward the ground surface. The inboard portion may also include a housing 34 which may contain operational elements of the apparatus which are mounted on the inboard portion. The housing 34 may define an interior 36 for housing those elements. The housing may have a pair of end walls 38, 39, a pair of side walls 40, 41 a top wall 42 and a bottom wall 43.

Optionally, one or more balancing weights or counterweights 44 mountable on the inboard portion of the frame, such as in a position adjacent to the end wall 38 to counterbalance the eccentric load of the cantilevered bridging portion and outboard portion of the frame. The counterweights 44 may be removably attached to the frame in any suitable manner.

Figure 4:
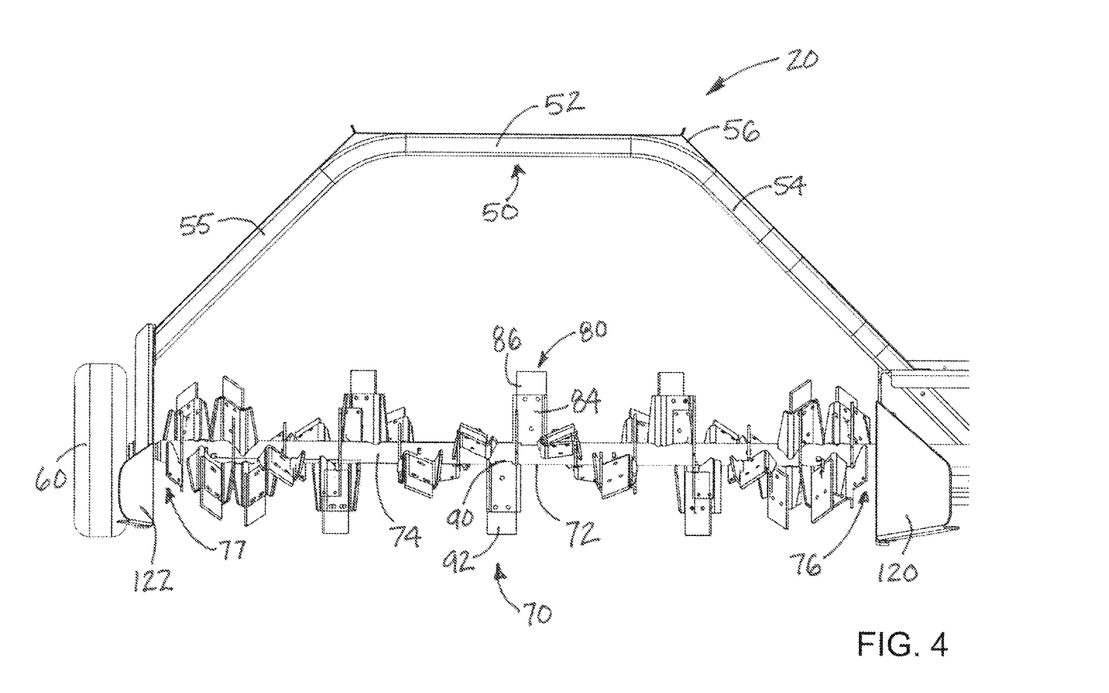
FIG. 4 is a schematic front view of the bridging portion and outboard portion of the frame of the apparatus as well as the rotor 70, according to an illustrative embodiment.

The bridging portion 20 of the frame may include a bridging beam 50 which extends between the inboard and outboard portions and may function as a spine of the frame. The bridging beam 50 may have an upper extent 52 and a pair of side extents 54, 55. The side extents may extend from the central extent in opposite directions toward the inboard and outboard portions of the frame. The upper extent 52 of the beam may be substantially horizontally oriented, while in some embodiments the side extents 54, 55 may be inclined downwardly and outwardly from the upper extent to define an arc that forms the windrow tunnel. The bridging portion may also include a bridging shield 56 which is configured to block upward movement of windrow materials moving through the windrow tunnel and being engaged by the apparatus, and may help to form the compost materials into a windrow. The bridging shield 56 may be mounted on the bridging beam in an arc similar to the beam, and may extend forwardly and rearwardly from the bridging beam.

The apparatus 10 may also include a plurality of flaps 58 mounted on the frame 14 for containing compost turned by the apparatus. The flaps 58 may be mounted on at least the bridging portion of the frame, and may also be mounted on the inboard 16 and the outboard 18 portions of the frame. The flaps 58 may depend downwardly from the bridging portion in front of the windrow tunnel, and may be generally located in a substantially vertical plane. The flaps may be located toward the forward lateral side 22 of the frame, and may be positioned adjacent to the forward opening 26 of the windrow tunnel. The flaps 58 may be formed of a flexible material to permit deflection of the flaps as the flaps pass over the compost windrow to contain compost material from flying in a forward direction to enhance the safety of people located around the apparatus and to also help form a better compost pile.

Figure 9:
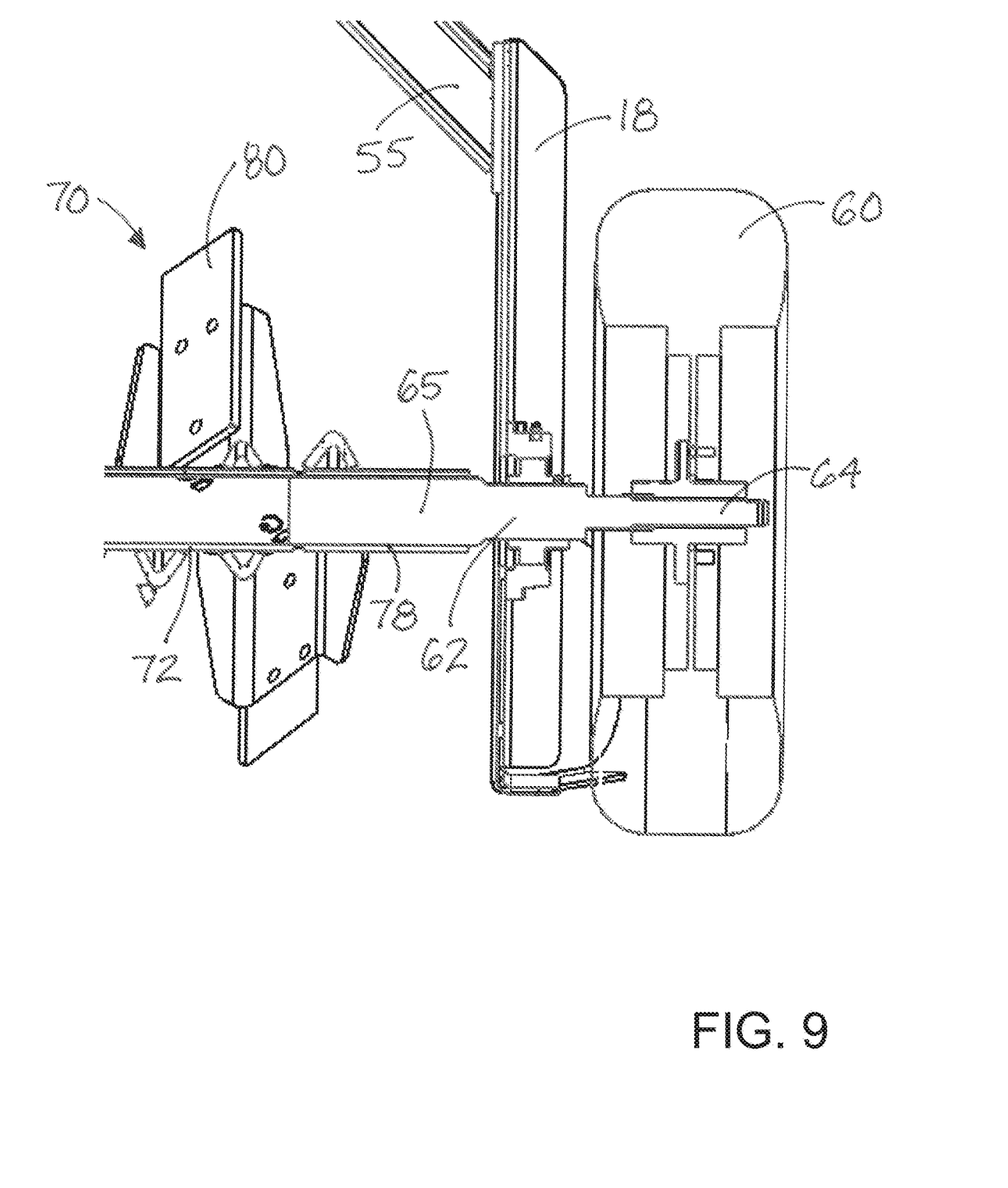
FIG. 9 is a schematic partial section view of the outboard portion of the frame and the support wheel, according to an illustrative embodiment.
Figure 10:
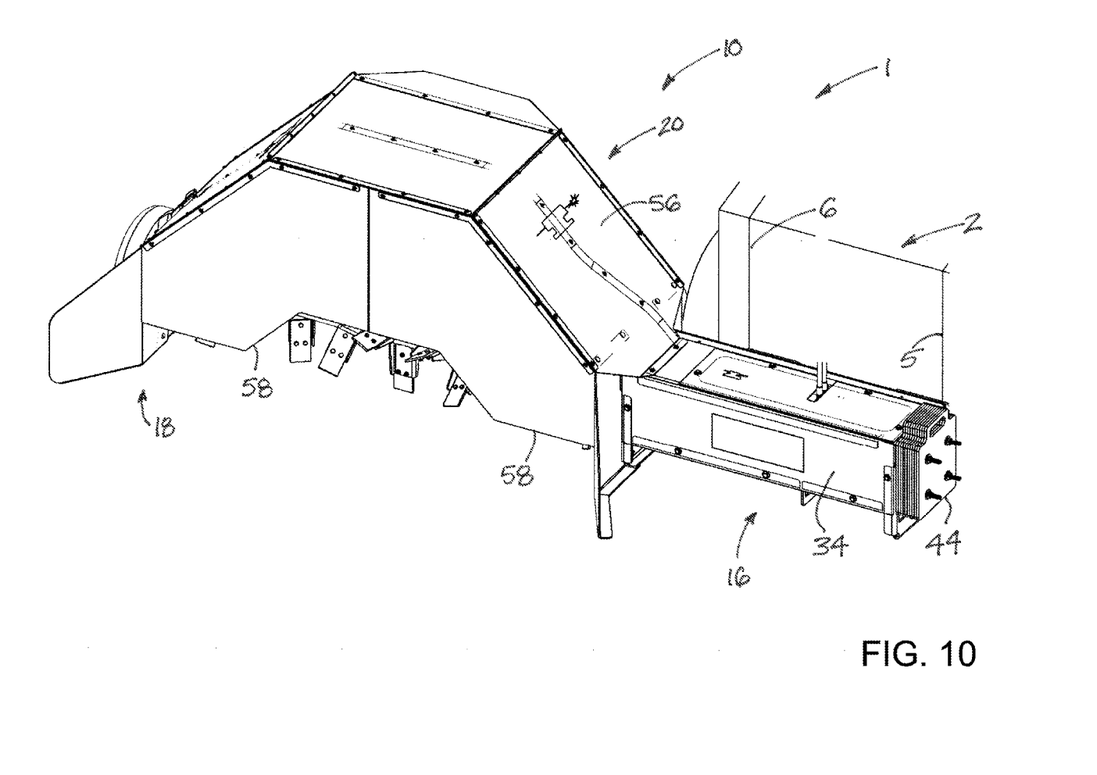
FIG. 10 is a schematic front perspective view of an embodiment of the loader-mountable compost turning apparatus.
Figure 11:
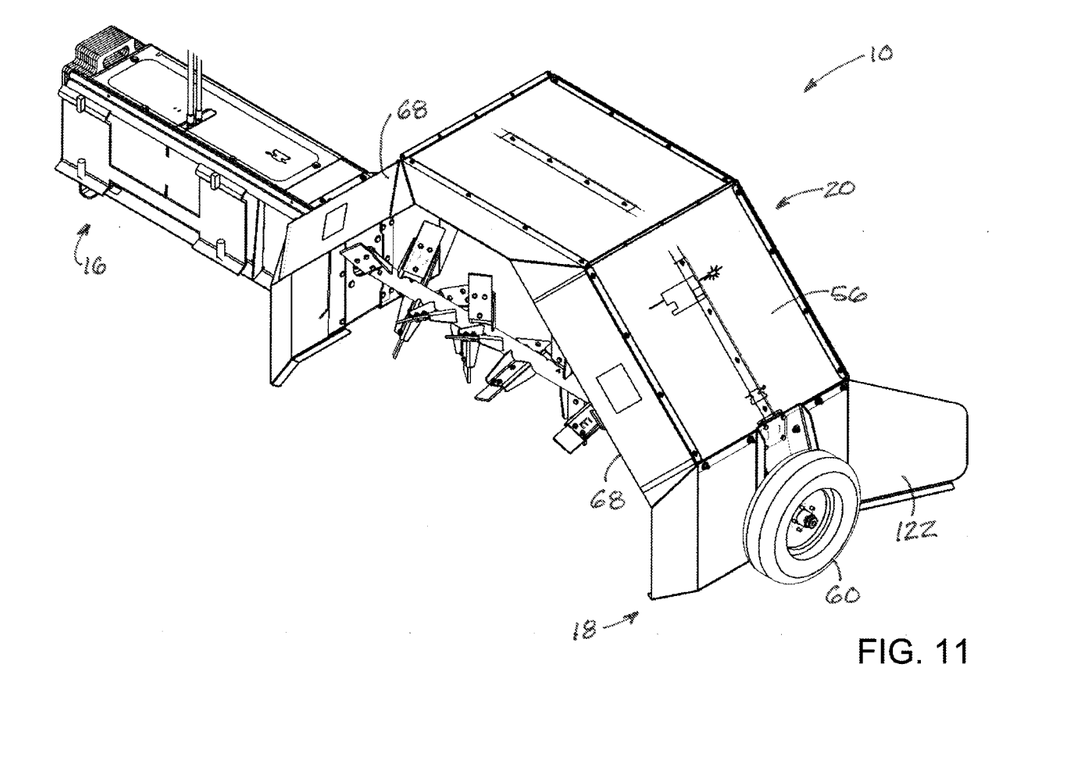
FIG. 11 is a schematic rear perspective view of the compost turning apparatus of FIG. 10.

The apparatus 10 may also include a plurality of panels 68 mounted on the frame for forming a compost pile by the apparatus. The panels 68 may be mounted on at least the bridging portion 20 of the frame, and may also be mounted on the inboard and outboard portions. The panels 58 may extend downwardly and rearwardly from the bridging portion behind the windrow tunnel, and may be located toward the rearward lateral side of the of the frame and positioned adjacent to the rearward opening of the windrow tunnel, The panels 68 may be formed of a rigid material to support the cantilevered extension of the panels from the bridging portion as well as the panels ;

The compost turning apparatus 10 may also include at least one support wheel 60 which is mounted on the frame to at least partially support the frame on the ground surface. The support wheel 60 may be mounted on the outboard portion 18 of the frame and rotate about an axis which is oriented substantially parallel to the longitudinal direction of the mobile base. The support wheel 60 may freely rotate with respect to the frame, although it is conceivable that the support wheel could be driven to assist in the movement of the apparatus over the ground surface. The support wheel 60 may be mounted on a stub axle 62 which is mounted on the outboard portion of the frame, and the support wheel may be freely rotatable with respect to the stub axle. In some embodiments, the support wheel 60 may be mounted on the stub axle 62 using a bearing or bushing to permit free rotation of the wheel with respect to the axle, and the stub axle may be mounted on the outer portion of the frame via a bearing or bushing to permit free rotation of the stub axle with respect to the frame. The stub axle 62 may extend along an axis which is oriented substantially parallel to the longitudinal direction of the mobile base. The stub axle may have an outer section 64 which extends from the outboard portion of the frame in a direction away from the bridging and inboard portions of the frame, and an inner section 65 which extends from the outboard portion into the windrow tunnel and generally below the bridging portion of the frame.

The compost turning apparatus 10 may also include a rotor 70 which is mounted on the mobile base 12 and may be mounted in a manner such that rotation of the rotor with respect to the frame is facilitated. The rotor 70 may be mounted on the inboard and the outboard portions of the frame, and may be located generally below the bridging portion of the frame. The rotor may extend generally parallel to the longitudinal direction of the mobile base. The rotor 70 may include a rotor shaft 72 which is rotatably mounted on the frame. The rotor shaft 72 may extend across the windrow tunnel 24 defined by the frame. The rotor shaft 72 may have an outer surface 74 and opposite end portions 76, 77 which are generally mounted on the respective inboard and outboard portions of the frame. The rotor shaft may be formed from a solid rod and/or a hollow tube with sufficient strength. A distal end portion 76 may define a recess 78 for receiving a portion of the inner section 65 of the stub shaft to support the end portion on the frame. The rotor shaft may extend through a bearing or bushing mounted on the housing of the inboard portion of the frame.

The rotor 70 may also include a plurality of paddles 80 for contacting compost in the windrow and moving the material and disturbing the arrangement of the materials in the windrow. Each paddle 80 has a front surface 82 which is oriented in the direction of rotation of the rotor shaft and primarily contacts the compost materials. Each paddle 80 may include a base portion 84 which is mounted on the outer surface 74 of the rotor shaft, and may further include an extension portion 86 which is mounted on the base portion 84 at a location that is spaced radially outwardly from the outer surface 74. In some embodiments, the base and extension portions of the paddles may be formed of different materials, with the material forming the base portion being relatively rigid and tough while the material forming the extension portion may be less rigid and may provide a replaceable wear element for contacting the material and ground surface. Each paddle 80 may also include a reinforcing rib 88 which extends outwardly from the outer surface 74 of the rotor shaft and may typically be positioned rearwardly of the base portion and may be connected to the rear surface of the base portion, although ribs positioned forwardly of the base portion and connected to the front surface of the base portion may also be employed. The paddles 80 may have a root 90 at the outer surface 74 of the rotor shaft and a tip 92 which is positioned opposite of the root 90 at the outermost extent of the paddle.

The plurality of paddles 80 may have a plurality of different paddle positions, and may also have a plurality of different paddle orientations, on the outer surface 74 of the rotor shaft. In greater detail, the paddle positions on the outer surface between the midpoint 75 and the first opposite end portion 76 of the rotor shaft may be a substantial mirror image of the paddle positions on the outer surface between the midpoint 75 and the second opposite end portion 77 (see, for example, FIG. 6). In some embodiments, the paddle positions may be arranged in a series of circumferential rows 94, with each row having a pair of the paddles located at substantially opposite circumferential locations on the outer surface 74, or having approximately 180 degrees between the paddles of the same row. The series of circumferential rows may be spaced from each other in the longitudinal direction of the rotor shaft, and spacings between the rows may vary. In some embodiments, the spacing distances between rows toward the midpoint 75 of the outer surface may be relatively greater than spacings between the rows toward the end portions 76, 77 of the outer surface which may facilitate the movement by the rotor of compost material toward the midpoint of the rotor shaft and the middle of the windrow to help produce a taller and narrower windrow shape. The paddle positions of adjacent circumferential rows may also be circumferentially offset with respect to each other by a circumferential offset angle.

Figure 6:
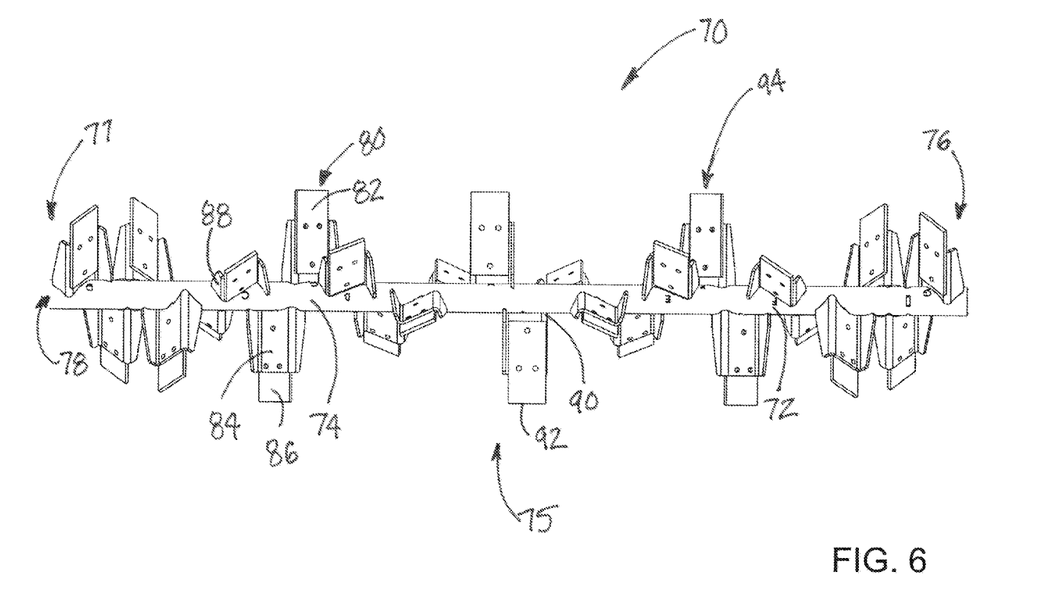
FIG. 6 is a schematic rear view of the rotor, according to an illustrative embodiment.
Figure 7:
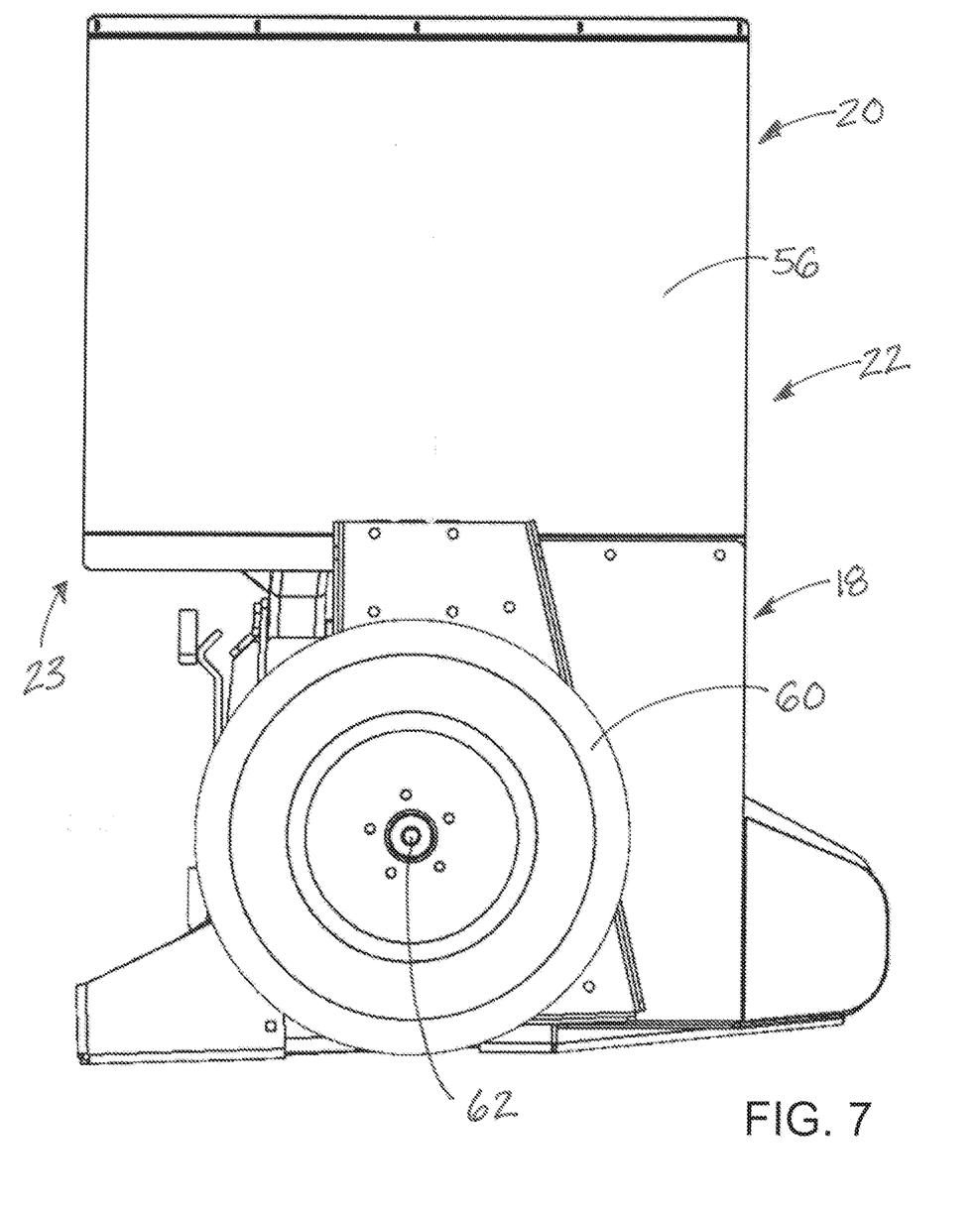
FIG. 7 is a schematic outboard end view of the compost turning apparatus, according to an illustrative embodiment.
Figure 8:
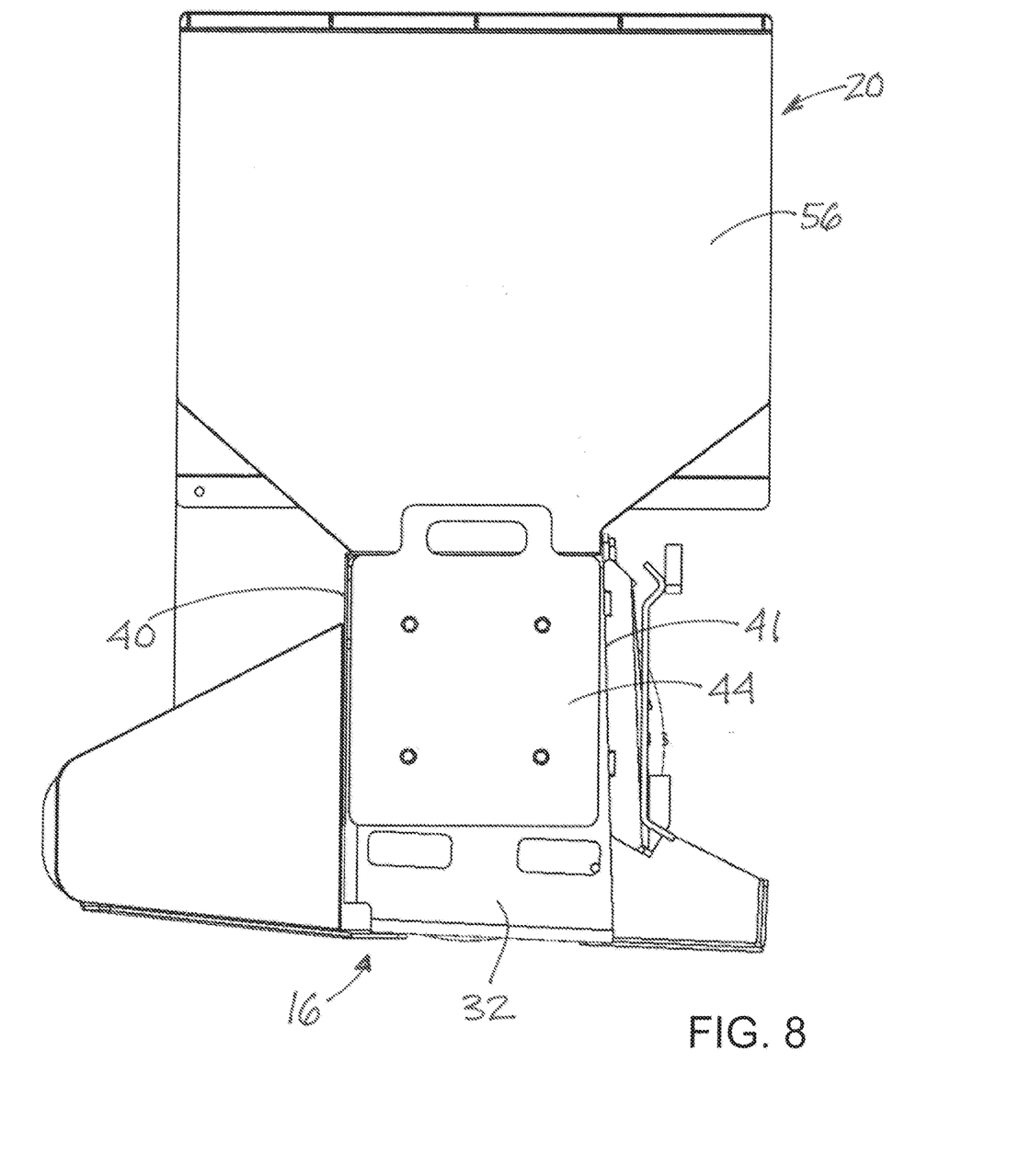
FIG. 8 is a schematic inboard end view of the compost turning apparatus, according to an illustrative embodiment.

The paddle orientations of the plurality of paddles 80 may be characterized by having an angle of yaw rotation of the front surface 82 of the paddles about a radial axis passing through the central longitudinal axis of the rotor shaft and radiating outwardly to the location on the outer surface 74 of the rotor shaft at which the paddle is mounted on the drum (see, for example, FIG. 6). The degree of yaw rotation may be measured between the plane of the front surface 82 of the paddle and a neutral plane which extends radially outwardly from the central longitudinal axis of the rotor shaft and through the location on the outer surface of the rotor shaft at which the paddle is mounted on the shaft. In some embodiments, the degree of yaw rotation of the front surface of the paddle may be relatively greater toward the end portions 76, 77 of the outer surface of the rotor shaft, and may be relatively lesser toward the midpoint 75 of the outer surface of the rotor shaft to facilitate the movement by the rotor of compost material toward the midpoint 75 of the drum to produce a taller windrow.

The paddle orientations of the paddles 80 may also be characterized by an angle of pitch rotation of the front surface 82 of the paddle about an axis extending parallel to the central longitudinal axis of the rotor shaft (see, for example, FIG. 6). The degree of pitch rotation may be measured between the front surface 82 of the paddle and the neutral plane extending radially outward from the central longitudinal axis of the rotor shaft and through the location on the outer surface of the rotor shaft at which the paddle is mounted on the rotor shaft. The degree of pitch rotation of the front surface of the paddles may be positive such that the front surface is rotated or tipped forward of the neutral plane and so that the tip 92 of the paddle is positioned forwardly of the neutral plane (while the root 90 of the paddle essentially lies in the neutral plane). The positive angle of pitch rotation provides further assistance in the movement of the compost material toward the midpoint 75 of the rotor shaft, and may also help to pull the paddles 80 into the compost materials of the windrow to increase the material engaged or grabbed by the paddle and may also assist the loader vehicle in moving the apparatus forwardly along the windrow.

The apparatus 10 may also include a rotor drive assembly 100 which is configured to rotate the rotor 70 with respect to the frame 14. The rotor drive assembly 100 may include a motor 102 which is mounted on the frame, and may be located on the inboard portion in the interior 36 of the housing 34. In some embodiments, the motor 102 may be a hydraulically-driven motor which may be fluidly connected to the hydraulic power system of the loader to provide power to the rotor drive assembly and also provide control of the rotor drive assembly. The rotor drive assembly 100 may also include a drive linkage 104 connecting the motor 102 to the rotor shaft 72 to permit the motor to rotate the rotor shaft with respect to the frame 14. The drive linkage may comprise a drive sprocket 106 which is mounted on the rotating shaft of the motor, a driven sprocket 108 which is mounted on the rotor shaft 72, and the chain 110 which links the sprockets 106, 108 together to transfer rotation of the drive sprocket to the driven sprocket. A control may be provided to control flow of the hydraulic fluid to the motor 102 from the loader and thereby control the rotation of the rotor.

In some embodiments, the apparatus 10 may also include a pair of compost guides 120, 122 which are configured to guide composting material in the windrow toward the windrow tunnel 24. Each of the compost guides may be mounted on the frame 14, with one of the compost guides being mounted on the inboard portion 16 of the frame and another one of the compost guides being mounted on the outboard portion 18 of the frame.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A compost turning apparatus mountable on at least one support arm of a loader for turning composting materials in a windrow resting on a ground surface, the apparatus comprising:
    a mobile base elongated in a longitudinal direction with opposite inboard and outboard ends, the mobile base having a frame with a forward lateral side for orienting in a forward direction of movement of the mobile base, the forward direction of movement being oriented substantially perpendicular to the longitudinal direction, the frame having a rearward lateral side oriented away from the forward lateral side, the frame having an inboard portion located toward the inboard end of the mobile base, an outboard portion located toward the outboard end of the mobile base, and a bridging portion extending between the inboard and outboard portions, the frame defining a windrow tunnel through which a windrow of composting materials resting on the ground surface moves during movement of the mobile base in the forward direction, the windrow tunnel being positioned between the inboard and outboard portions of the frame and below the bridging portion of the frame such that the inboard portion is longitudinally offset from the windrow tunnel and the inboard portion does not move over composting materials moving through the windrow tunnel; and
    a rotor rotatably mounted on the mobile base and extending across the windrow tunnel, the rotor including:
        a rotor shaft mounted on the frame to rotate about a central longitudinal axis of the rotor shaft; and
        a plurality of paddles each having a base and a tip and a radial axis extending from the base to the tip, each paddle of the plurality of paddles having the base of the paddle mounted on the rotor shaft and extending outwardly from the rotor shaft along a respective said radial axis to the tip of the paddle opposite of the base;
        wherein each paddle includes a paddle panel having a front surface oriented forwardly with respect to rotation of the rotor shaft, the front surface of the paddle panel being substantially planar in shape and extending laterally transverse to the radial axis and terminating at the tip with a blunt end edge;
    a rotor drive assembly mounted on the mobile base and being configured to rotate the rotor shaft and plurality of paddles of the rotor with respect to the frame;
    wherein the inboard portion of the frame includes a mount structure configured to be engaged by the at least one support arm of the loader to removably mount the apparatus on the at least one support arm such that raising and lowering of the at least one support arm raises and lowers the apparatus with respect to the ground surface below the apparatus, the mount structure being located on the rearward lateral side of the frame such that forward movement of the loader moves the apparatus in the forward direction of movement of the mobile base;

wherein the rotor drive assembly includes a motor hydraulically-connectable to a hydraulic power system of the loader.

2. The apparatus of claim 1 wherein the mount structure of the frame is configured to engage an attachment structure mounted on a distal end of the at least one support arm of the loader; and wherein the mount structure of the frame configured to engage the attachment structure on the at least one support arm is located on the rearward lateral side of the frame to position the apparatus to the front of the loader when the apparatus is mounted on the at least one support arm of the loader.

3. The apparatus of claim 1 wherein the mount structure comprises at least one mounting rail for engaging a mounting plate mounted on the at least one support arm of the loader.

4. The apparatus of claim 3 wherein the at least one mounting rail comprises a pair of substantially horizontally-oriented mounting rails with a first one of the mounting rails being located above a second one of the mounting rails.

5. The apparatus of claim 1 wherein the inboard portion of the frame includes a support foot extending downwardly lower than each outward end of the paddles of the rotor so as to be restable on the ground surface below the apparatus and provide at least partial support for the frame.

6. The apparatus of claim 1 wherein the mobile base includes at least one support wheel mounted on the outboard portion of the frame to at least partially support the frame when the mobile base is mounted on the at least one support arm of the loader.

7. The apparatus of claim 1 wherein the substantially planar front surface of the paddles of the plurality of paddles has a width in a direction transverse to the radial axis of the rotor shaft; and wherein the width of the front surface of the paddle panel is substantially uniform from a radially innermost end of the paddle panel to a radially outermost end of the paddle panel.

8. The apparatus of claim 1 wherein the windrow tunnel includes a bridging shield extending forwardly from the forward lateral side of the frame to form a forward opening and extending rearwardly from the rearward lateral side of the frame.

9. The apparatus of claim 1 additionally comprising compost guides mounted on the frame on each longitudinal end of the windrow tunnel to guide composting material in the windrow toward the windrow tunnel.

10. The apparatus of claim 1 wherein the rotor shaft has a pair of opposite ends and a midpoint between the opposite ends; and wherein positions of the paddles between the midpoint of the rotor shaft and a second said end of the rotor shaft are a mirror image of positions of the paddles between the midpoint of rotor shaft and a first said end of the rotor shaft.

11. The apparatus of claim 1 wherein the front surface of each paddle is oriented toward a direction of rotation of the rotor, the front surface of each paddle having a width in a direction substantially parallel to the rotor shaft, the front surfaces of the paddles having a plurality of different orientations with respect to the rotor shaft.

12. A system comprising:
a loader having a forward direction of movement, the loader comprising:
a loader frame having a forward end and a rearward end and opposite lateral sides;
a hydraulic power system; and
a pair of support arms each being pivotally mounted on the loader frame and each being positioned alongside the opposite lateral sides of the loader frame and extending to the forward end of the loader frame, each support arm having a distal end for attachment to a loader implement, the distal ends of the support arms being located at the forward end of the loader frame; and
a compost turning apparatus for turning composting materials in a windrow resting on a ground surface, the turning apparatus being mounted on the distal ends of the pair of support arms of the loader at the forward end of the loader frame, the apparatus comprising:
a mobile base elongated in a longitudinal direction with opposite inboard and outboard ends, the mobile base having a frame with a forward lateral side for orienting in the forward direction of movement of the loader, the forward direction of movement of the loader being oriented substantially perpendicular to the longitudinal direction of the mobile base, the frame having a rearward lateral side oriented away from the forward lateral side, the rearward lateral side being oriented toward the forward end of the loader frame of the loader, the frame having an inboard portion located toward the inboard end of the mobile base, an outboard portion located toward the outboard end of the mobile base, and a bridging portion extending between the inboard and outboard portions, the frame defining a windrow tunnel through which a windrow of composting materials resting on the ground surface moves during movement of the mobile base in the forward direction of movement of the loader, the windrow tunnel being positioned between the inboard and outboard portions of the frame and below the bridging portion of the frame such that the inboard portion is longitudinally offset from the windrow tunnel and the inboard portion does not move over composting materials moving through the windrow tunnel; and
a rotor rotatably mounted on the mobile base and extending across the windrow tunnel, the rotor including a rotor shaft rotatably mounted on the frame and a plurality of paddles mounted on the rotor shaft; and
a rotor drive assembly mounted on the mobile base and being configured to rotate the rotor with respect to the frame;
wherein the inboard portion of the frame includes a mount structure engaging the distal ends of the respective support arms of the loader to removably mount the apparatus on the support arms such that raising and lowering of the support arms raises and lowers the apparatus with respect to the ground surface below the apparatus, the mount structure being located on the rearward lateral side of the frame such that the compost turning apparatus is positioned forwardly of the loader frame of the loader and movement of the loader in the forward direction of movement of the loader moves the compost turning apparatus in the forward direction of movement of the loader; and wherein the rotor drive assembly includes a motor hydraulically-connected to the hydraulic power system of the loader.

13. The system of claim 12 wherein the mount structure of the frame engages an attachment structure mounted on a distal end of the at least one support arm of the loader.

14. The system of claim 12 wherein the mount structure comprises at least one mounting rail removably mounted on a mounting wall plate mounted on the at least one support arm of the loader.

15. The system of claim 14 wherein the at least one mounting rail comprises a pair of substantially horizontally-oriented mounting rails with a first one of the mounting rails being located above a second one of the mounting rails.

16. The system of claim 12 wherein the inboard portion of the frame includes a support foot extending downwardly lower than each outward end of the paddles of the rotor so as to be restable on the ground surface below the apparatus and provide at least partial support for the frame.

17. The system of claim 12 wherein the mobile base includes at least one support wheel mounted on the outboard portion of the frame to at least partially support the frame when the mobile base is mounted on the at least one support arm of the loader.

18. The system of claim 12 wherein at least one paddle of the plurality of paddles includes:
  a base portion mounted on and extending from the rotor shaft; and
  an extension portion mounted on the base portion at a location spaced from the rotor shaft, the base portion being formed of a relatively rigid material and the extension portion being formed of a relatively flexible material.

19. The system of claim 12 wherein the windrow tunnel includes a bridging shield extending forwardly from the forward lateral side of the frame to form a forward opening and extending rearwardly from the rearward lateral side of the frame to form a rearward opening.

20. The system of claim 12 wherein at least one paddle of the plurality of paddles has a front surface for contacting the composting materials, the front surface of the at least one paddle being planar and extending in the longitudinal direction of the mobile base.

* * * * *